United States Patent [19]
Barthelman

[11] Patent Number: 5,938,263
[45] Date of Patent: Aug. 17, 1999

[54] PROTECTOR FOR A PICKUP TRUCK

[76] Inventor: Scott Barthelman, 801 Third St., Kelona, Iowa 52247

[21] Appl. No.: 09/031,579

[22] Filed: Feb. 27, 1998

[51] Int. Cl.$^6$ ..................................................... B60N 3/12
[52] U.S. Cl. ........................................ 296/37.6; 296/39.2
[58] Field of Search ................................ 296/37.6, 39.2; 280/770

[56] References Cited

U.S. PATENT DOCUMENTS

| | | | |
|---|---|---|---|
| 2,460,394 | 2/1949 | Peatross | 280/770 |
| 2,690,928 | 10/1954 | Boynes | 296/95.1 |
| 4,253,785 | 3/1981 | Bronstein | 410/110 |
| 4,530,519 | 7/1985 | Marshall | 280/770 |
| 4,639,027 | 1/1987 | Boyd | 280/770 |
| 4,750,767 | 6/1988 | Barnett | 280/770 |
| 4,974,892 | 12/1990 | Huard | 280/770 |
| 5,080,250 | 1/1992 | Dickinson et al. | 296/37.6 |
| 5,290,618 | 3/1994 | Olsen et al. | 280/770 |
| 5,299,722 | 4/1994 | Cheney | 296/37.6 |
| 5,316,358 | 5/1994 | Payne et al. | 296/37.6 |
| 5,636,883 | 6/1997 | Johns | 296/39.2 |
| 5,641,179 | 6/1997 | Imlach | 280/770 |
| 5,727,835 | 3/1998 | Krush et al. | 296/37.6 |
| 5,788,307 | 8/1998 | Gilbert | 280/770 |
| 5,791,013 | 8/1998 | Lin | 16/87.2 |
| 5,799,975 | 9/1998 | Crick | 280/770 |

*Primary Examiner*—Joseph D. Pape
*Assistant Examiner*—Kiran Patel
*Attorney, Agent, or Firm*—Michael I. Kroll

[57] ABSTRACT

A protector (10) for a pickup truck (12) having a pair of sidewalls (14), a tool box (16) for holding tools (18) mounted on a cargo beg (20) and a lid (22) hinged to the tool box (16). The protector (10) comprises a mat (24) and a structure (26) for installing one edge (28) of the mat (24) within the tool box (16). When the lid (22) of the tool box (16) is opened, the mat (24) can be extended out of the tool box (16) to hang down over one sidewall (14) of the pickup truck (12), so as to prevent damage and scratches made to paint on the sidewall (14) when a person loads and unloads the tools (18) into and out of the tool box (16).

7 Claims, 6 Drawing Sheets

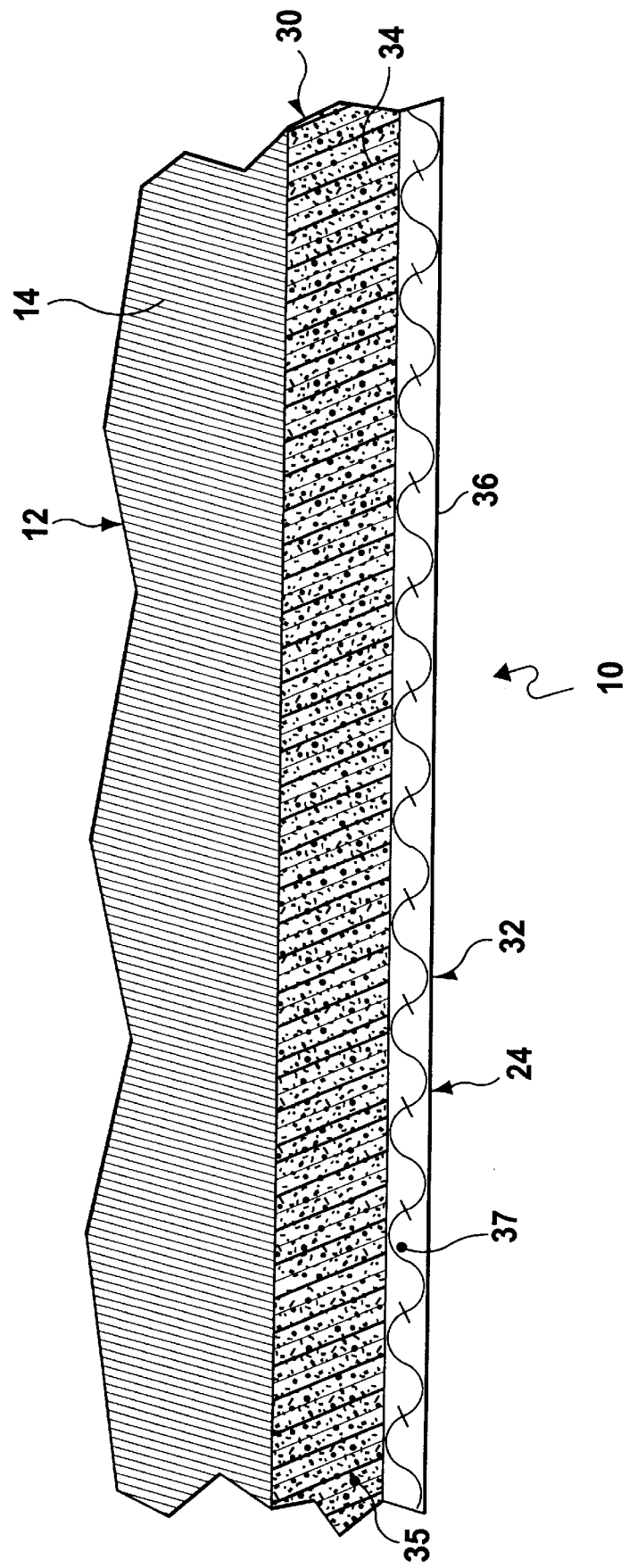

PROTECTOR FOR A PICKUP TRUCK

BACKGROUND OF THE INVENTION

1. Field of the Invention

The instant invention relates generally to motor vehicle covers and more specifically it relates to a protector for a pickup truck. The protector for a pickup truck is a mat on a cargo bed of the pickup truck installed inside a tool box, which will prevent damage and scratches made to paint on a side wall of the pickup truck when the mat is extended over the sidewall and a person is loading and unloading tools into and out of the tool box. The protector for a pickup truck can be used for advertising purposes by having a logo or company name printed on an outer surface of the mat. When the mat is extended over the sidewall of the pickup truck, the logo or company name can be seen therefrom.

2. Description of the Prior Art

Numerous motor vehicle covers have been provided in prior art. For example, U.S. Pat. Nos. 4,253,785 to Bronstein; 5,290,618 to Olson et al.; 5,636,883 to Johns and 5,641,179 to Imlach all are illustrative of such prior art. While these units may be suitable for the particular purpose to which they address, they would not be as suitable for the purposes of the present invention as heretofore described.

An edge protector and anchor member for the upper edge portion of the sidewall of a pickup truck box is formed as a generally U-shaped channel member. One leg of the member extends into the interior of the box to protect the upper inside portion of the sidewall. The other leg extends downwardly on the outside of the sidewall and has a plurality of spaced apart anchor means along the marginal edge thereof. Each anchor means comprises a tab flanked by notches struck from the leg with the tab being bent inwardly of the channel member. A rope or other tie-down device may be connected to the tabs for securing a load in the box.

A single layer protective cover of a flexible synthetic leather-like material resistant to automotive chemicals and having a smooth cushioning non-slipping non-scratching inward or under surface of a length and width to cover an automotive fender adequately for its protection against scratches while a technician is working under the raised hood of the automobile and flexible means having terminal hooks to secure said cover.

A pair of covers for the sidewalls of a pickup truck consists of an outer panel cover and an inner panel cover removably attached along an edge. The outer panel cover overlies the outside face of the sidewall and the top rail, and fastens to the bottom edge of the sidewall with specially shaped plastic hooks. The inner panel cover removably attaches to wall fasteners that in turn permanently attach to the inside face of the sidewall forming part of the cargo bed. The two sides of the inner panel cover are made of materials with different textures, to allow the user a choice of surfaces for lining the bed. A number of tie-down straps provide points for securing a load in the bed. A strip of reinforcing material is attached to the outer panel cover along the section covering the top rail, and provides both stress relief and an attaching surface for the tie-down straps. A flap attached to the outer panel cover is fitted to wrap partly over the front wall of the bed, to prevent wind from blowing between the outer panel cover and the sidewall during driving. A decorative panel removably attached to the outer panel cover provides a way to change the appearance of the device and to display a printed message.

A body side protector for vehicles equipped with a truck tool box that prevents damage to the side of a truck when the truck tool box is accessed. The protector includes a resilient mat, a flexible magnet, at least one flexible strap, and a mounting bar. The resilient mat has a resilient mat front face, a resilient mat rear face, and a resilient mat top and contains at least one longitudinally disposed mat strap slot opening at the resilient mat top. The resilient mat readily conforms to and protects the specific contour of the side rail. The flexible magnet is attached to the resilient mat rear face, so that the resilient mat is readily removably affixed to the specific contour of the side rail. The at least one flexible strap is disposed within a respective one of the at least one longitudinally disposed mat strap slots. Each of the at least one flexible strap has a flexible strap distal end that extends past the resilient mat top and contains a flexible strap distal end aperture. The mounting bar has a mounting bar front, a mounting bar back, and a mounting bar bottom. The mounting bar contains at least one longitudinally disposed mounting bar slot that opens at the mounting bar bottom. The mounting bar further contains at least one mounting bar aperture that is aligned with the flexible strap distal end aperture of a respective one of the at least one flexible strap.

SUMMARY OF THE INVENTION

A primary object of the present invention is to provide a protector for a pickup truck that will overcome the shortcomings of the prior art devices.

Another object is to provide a protector for a pickup truck that is a mat installed inside a tool box on a cargo bed of the pickup truck, which will prevent damage and scratches made to paint on a sidewall of the pickup truck when the mat is extended over the sidewall and a person is loading and unloading tools into and out of the tool box.

An additional object is to provide a protector for a pickup truck that can be used for advertising purposes by having a logo or company name printed on an outer surface of the mat, so that when the mat is extended over the sidewall of the pickup truck the logo or company name can be seen therefrom.

A further object is to provide a protector for a pickup truck that is simple and easy to use.

A still further object is to provide a protector for a pickup truck that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 6 is an enlarged cross sectional view taken along line 6—6 in FIG. 1, showing the first mat having an inner foam backing on an outer fabric sheet.

Similar reference characters denote corresponding features consistently throughout the attached drawings.

DETAILED DESCRIPTION OF THE PREFERRED EMBODIMENTS

Figure 1:
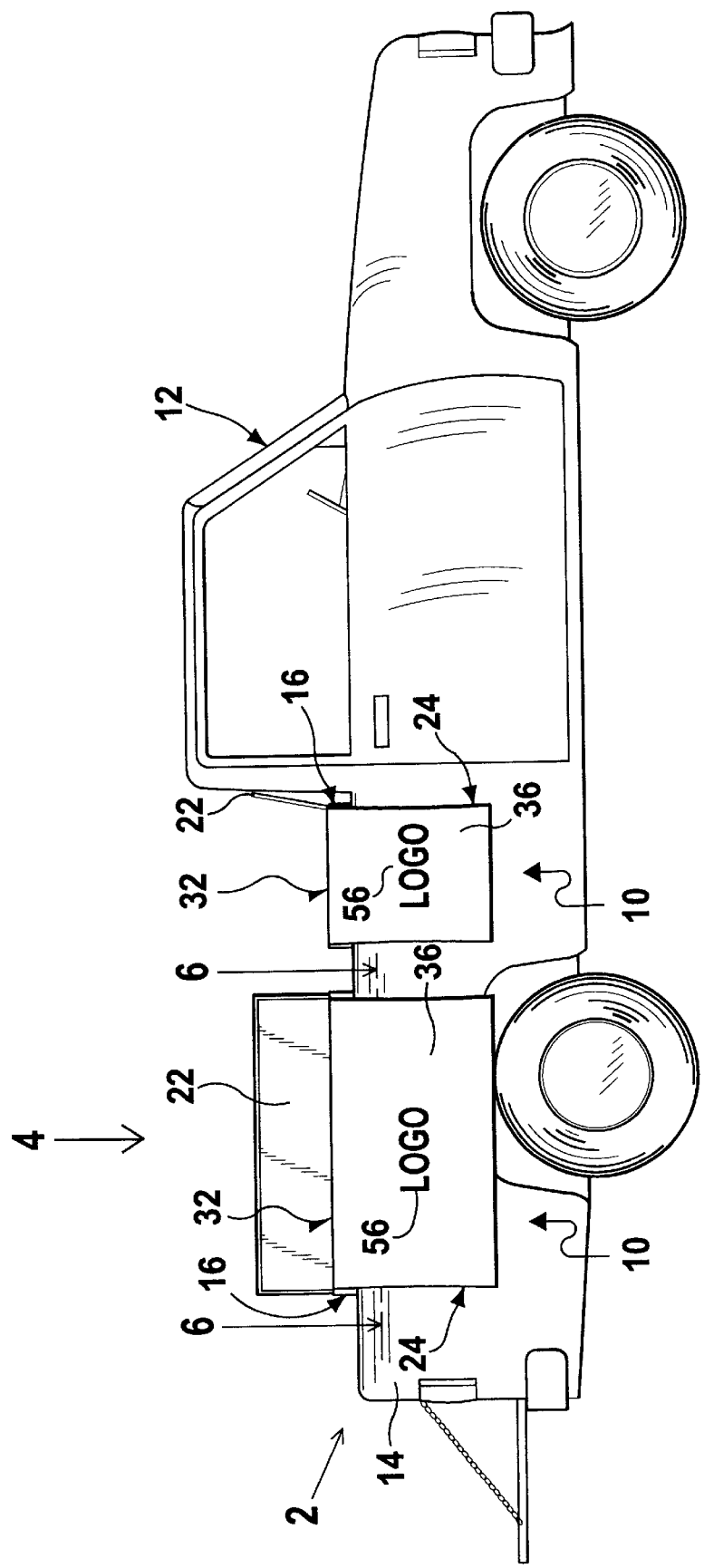
FIG. 1 is a side view of a pickup truck with two of the present invention installed and in use.
Figure 2:
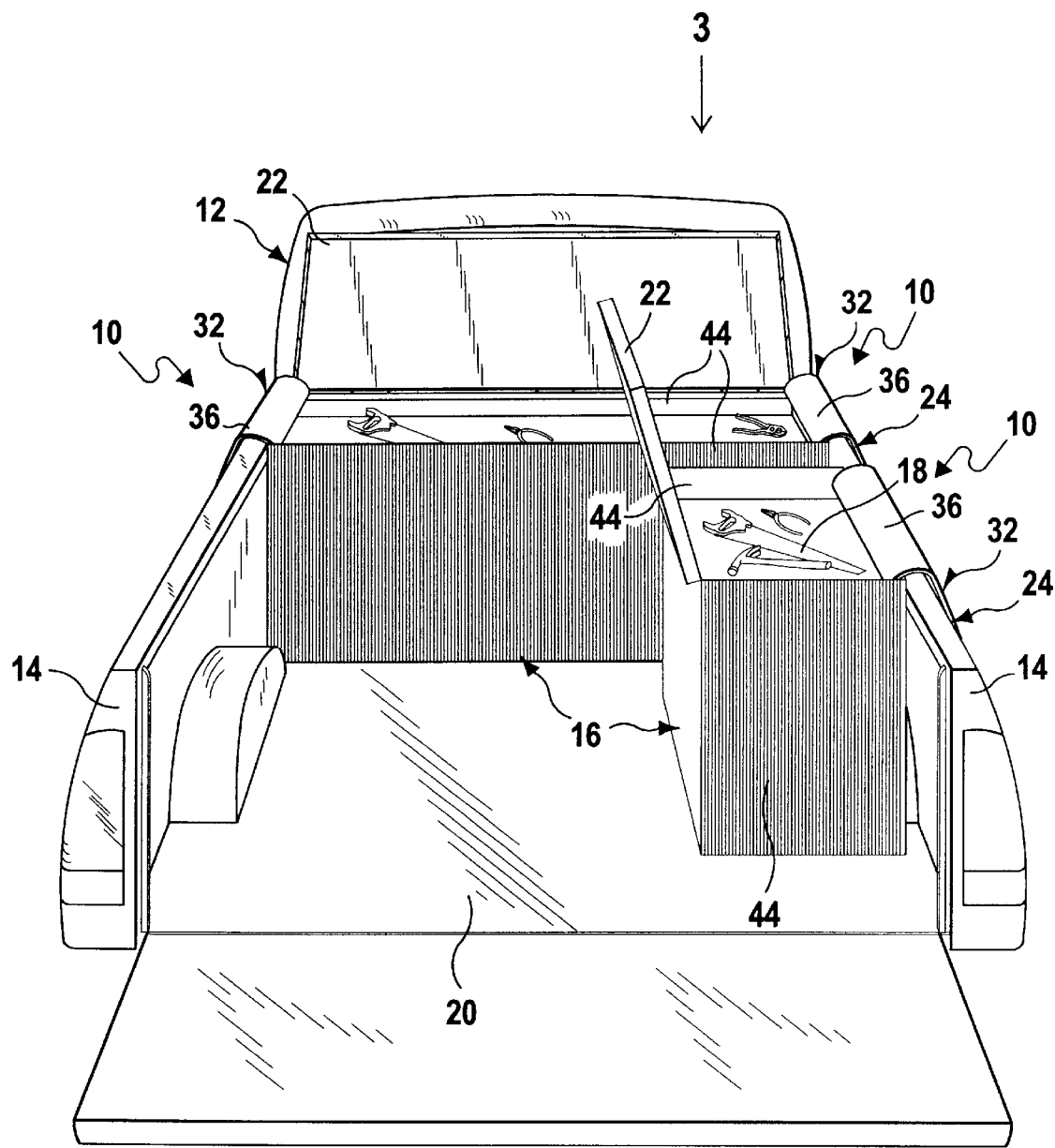
FIG. 2 is a rear perspective view taken in the direction of arrow 2 in FIG. 1.

Turning now descriptively to the drawings, in which similar reference characters denote similar elements throughout the several views, FIGS. 1 through 6 illustrate the present invention being a protector 10. With regard to the reference numerals used, the following numbering is used throughout the various drawing figures.

| | | |
|---|---|---|
| 10 | protector | |
| 12 | pickup truck | |
| 14 | sidewall of 12 | |
| 16 | tool box of 12 | |
| 18 | tool in 16 | |
| 20 | cargo bed of 12 | |
| 22 | lid of 16 | |
| 24 | mat of 10 | |
| 26 | installing structure of 10 | |
| 28 | one edge of 24 | |
| 30 | inner backing pad of 24 | |
| 32 | outer soft durable sheet of 24 | |
| 34 | foam material for 30 | |
| 35 | synthetic resin for 34 | |
| 36 | fabric material for 32 | |
| 37 | woven cloth for 36 | |
| 38 | elongated rod of 26 | |
| 40 | stitch on 24 | |
| 42 | retaining assembly of 26 | |
| 44 | sidewall of 16 | |
| 45 | first telescopic tube of 38 | |
| 46 | second telescopic tube of 38 | |
| 48 | expansion spring of 42 in 44 and 46 | |
| 50 | end cap of 42 | |
| 52 | mounting bracket of 42 | |
| 54 | fastener of 42 for 52 | |
| 56 | logo on 32 | |

The protector 10 is for a pickup truck 12 having a pair of sidewalls 14, a tool box 16 for holding tools 18 mounted on a cargo bed 20 and a lid 22 hinged to the tool box 16. The protector 10 comprises a mat 24 and a structure 26 for installing one edge 28 of the mat 24 within the tool box 16. When the lid 22 of the tool box 16 is opened, the mat 24 can be extended out of the tool box 16 to hang down over one sidewall 14 of the pickup truck 12, so as to prevent damage and scratches made to paint on the sidewall 14 when a person loads and unloads the tools 18 into and out of the tool box 16.

The mat 24, as best seen in FIG. 6, consists of an inner backing pad 30 and an outer soft durable sheet 32 attached to the inner backing pad 30. The inner backing pad 30 is fabricated out of a foam material 34, wherein the foam material is synthetic resin 35. The outer soft durable sheet 32 is fabricated out of a fabric material 36, wherein the fabric material 36 is a woven cloth 37.

Figure 3:
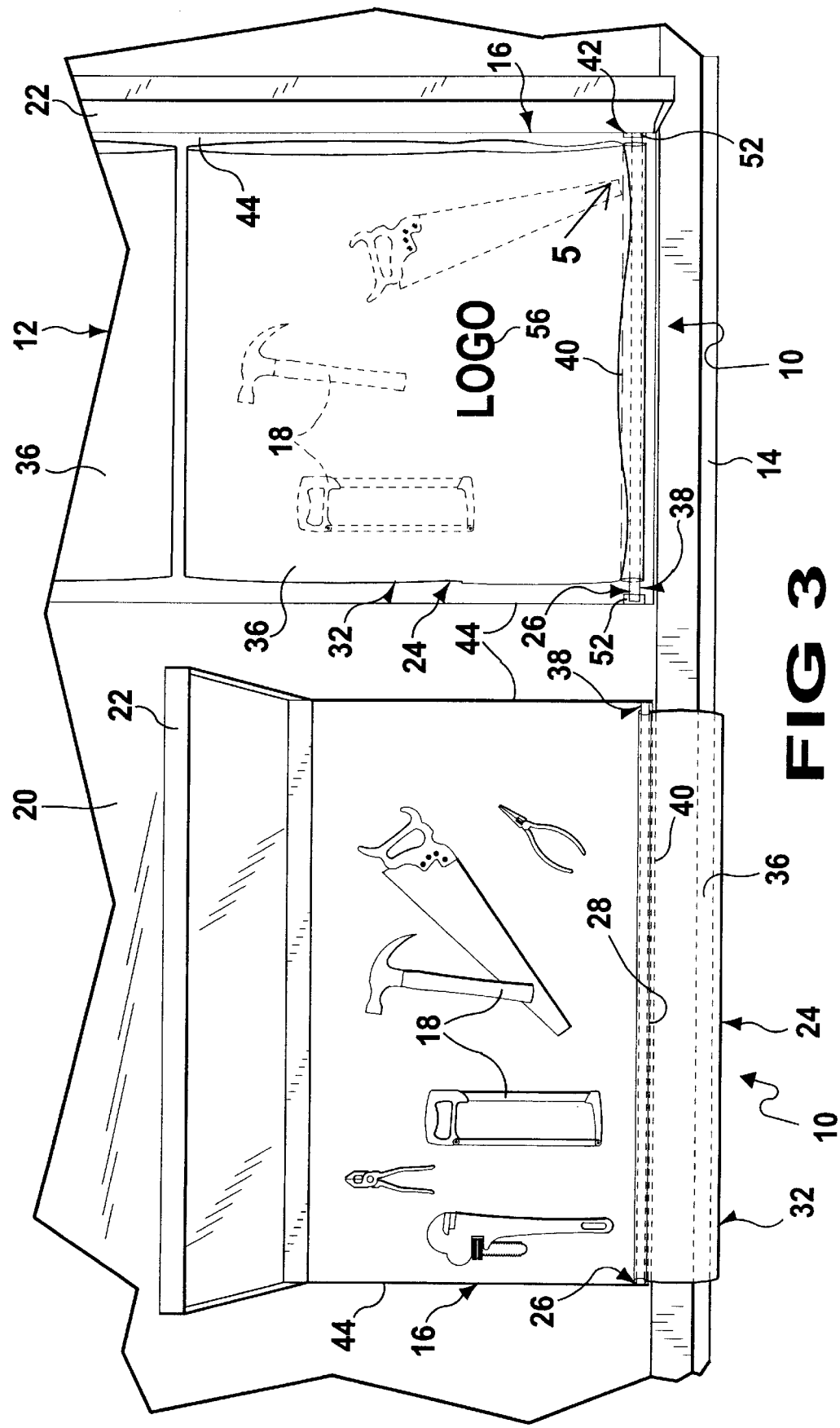
FIG. 3 is a top plan view taken in the direction of arrow 3 in FIG. 2, with parts broken away, showing the second mat placed back into the second tool box.

The installing structure 26 includes an elongated rod 38 to receive the one edge 28 of the mat 24 which is looped over the elongated rod 38, so that a seam can be stitched at 40 thereacross to hold the one edge 28 of the mat 24 thereto. An assembly 42 is for retaining opposite ends of the elongated rod 38 to upper sidewalls 44 of the tool box 16. In a first instance, as shown in FIGS. 3 and 5, the mat 24 can be folded within the tool box 16 over the tools 18. In a second instance, as shown in FIGS. 1, 2, 3 and 4, the mat 24 can be unfolded to extend out from the tool box 16 and hang down over the one sidewall 14 of the pickup truck 12.

Figure 4:
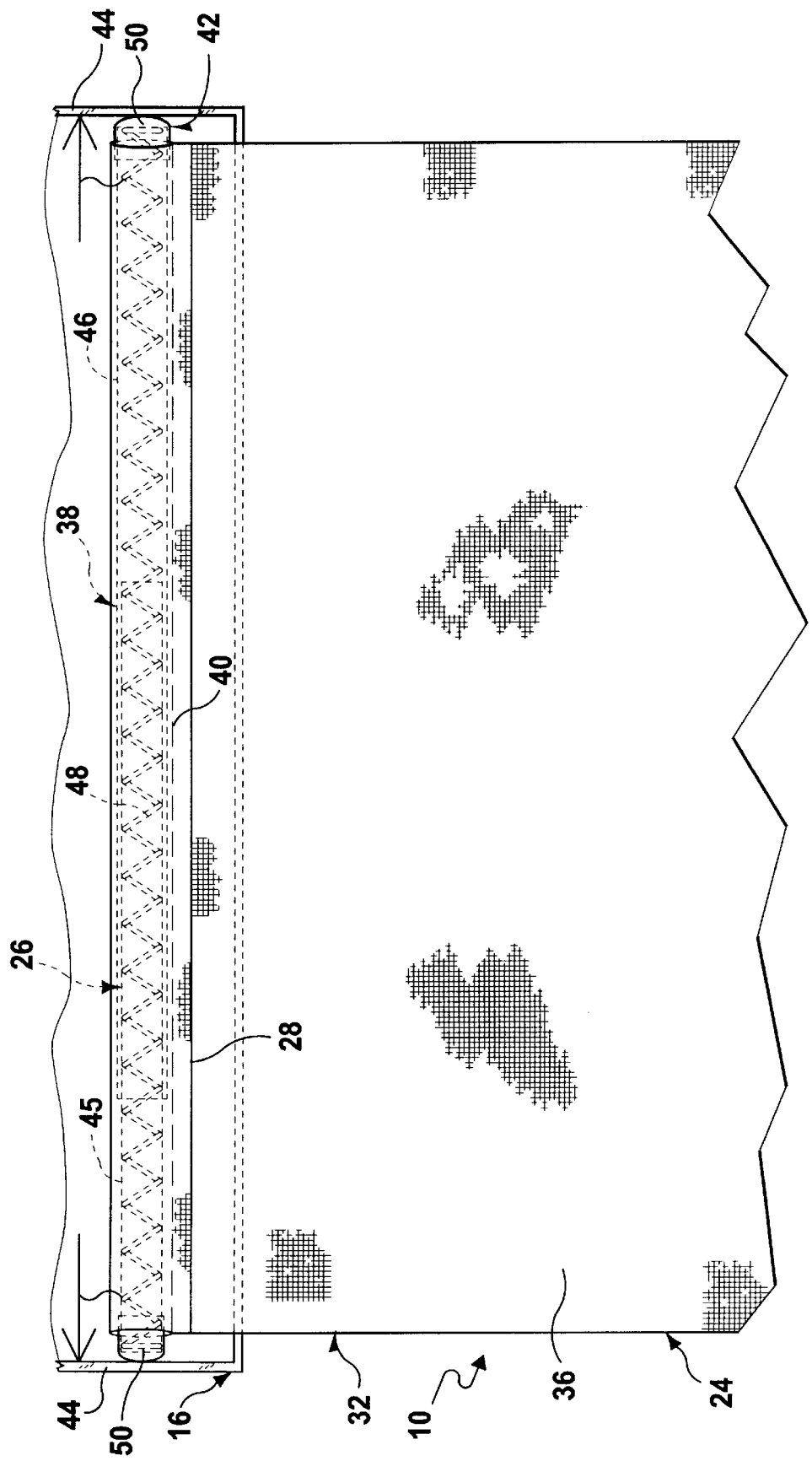
FIG. 4 is a top plan view taken in the direction of arrow 4 in FIG. 1, with parts broken away, showing the first mat on a spring loaded rod extended outwardly from the first tool box.
Figure 5:
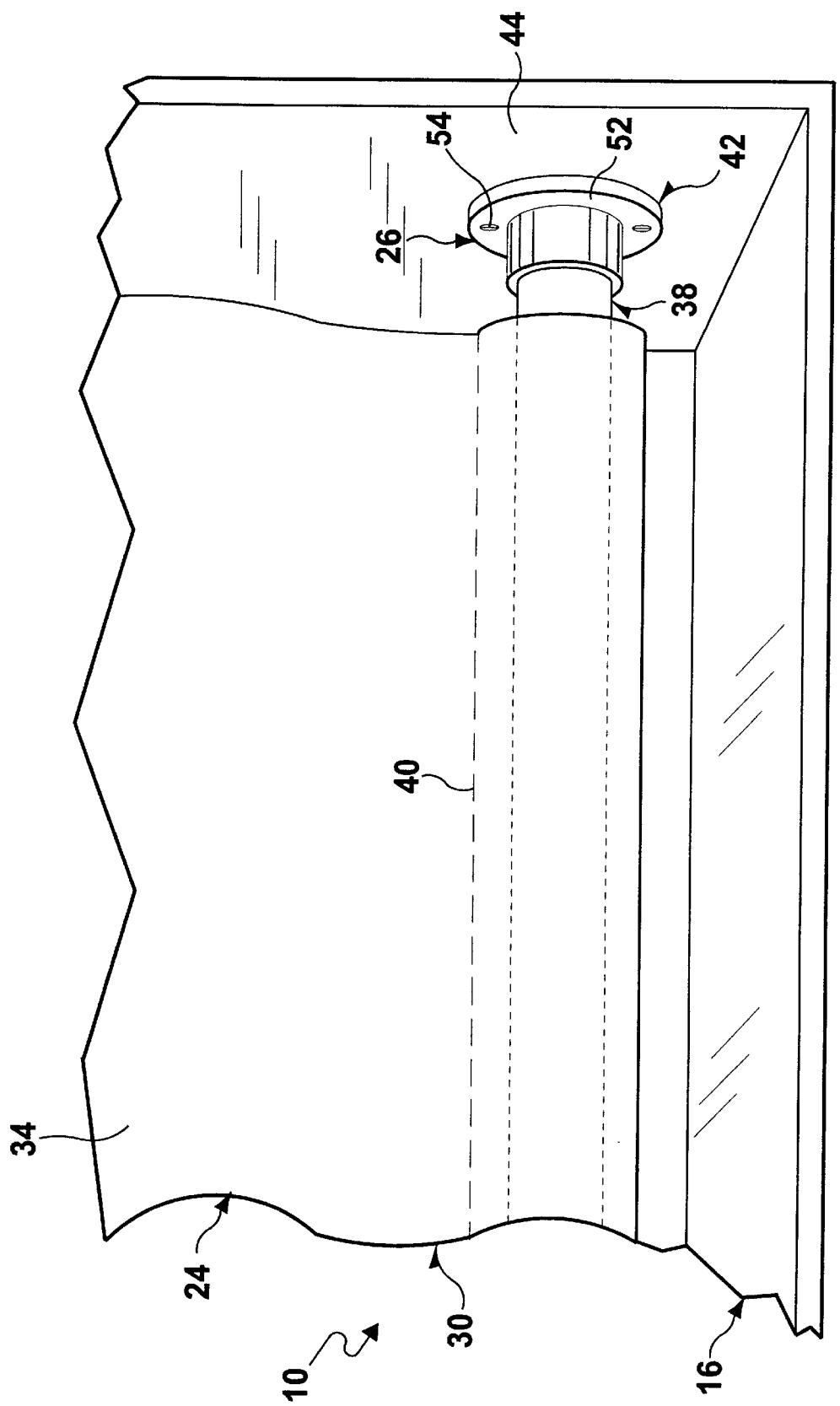
FIG. 5 is an enlarged top perspective view taken in the direction of arrow 5 in FIG. 3, with parts broken away, showing the second mat on a rod connected to one of two mounting brackets in the second tool box.

The retaining assembly 42, as best seen in FIG. 4, consists of the elongated rod 38 being two telescopic tubes 45 and 46. An expansion spring 48 is carried within the two telescopic tubes 44 and 46. A pair of end caps 50 are provided. Each end cap 50 fits on an opposite end of the two telescopic tubes 45 and 46. The expansion spring 48 will cause the end caps 50 to press against inner surfaces of the upper sidewalls 44 of the tool box 16 to hold the elongated rod 38 in place.

The retaining assembly 42 in FIG. 5 includes a pair of mounting brackets 52, in which only one is shown. Each mounting bracket 52 fits on an opposite end of the elongated rod 38. Fasteners 54 are for attaching the mounting brackets 52 to inner surfaces of the upper sidewalls 44 of the tool box 16 to hold the elongated rod 38 in place.

The protector 10, as shown in FIG. 1, can consist of the mat 24 further containing a logo 56 printed on the outer soft durable sheet 32. When the mat 24 hangs down over the one sidewall 14 of the pickup truck 12, the logo 56 can be seen therefrom for advertising purposes. The logo 56 can consist of a symbol, the name of a company and any other picture or design. The outer soft durable sheet 32 can be made in different colors to match or blend in with the pickup truck 12. At least one protector 10 can be used with the pickup truck 12. Two protectors 10 are shown in the drawings installed in two tool boxes 16.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A protector for, and in combination with a pickup truck having a pair of sidewalls, a tool box for holding tools mounted on a cargo bed and a lid hinged to the tool box, said combination comprising:

a) a mat comprising an inner backing pad and an outer soft durable sheet attached to said inner backing pad;

b) means for installing one edge of said mat within the tool box, so that when the lid of the tool box is opened said mat can be extended out of the tool box to hang down over one sidewall of the pickup truck, so as to prevent damage and scratches made to paint on the sidewall when a person loads and unloads the tools into and out of the tool box;

c) said installing means comprising an elongated rod to receive the one edge of said mat which is looped over and stitched thereacross and means for retaining opposite ends of said elongated rod to upper sidewalls of the tool box so that in first instance said mat can be folded within the tool box covering tools laying in the open permitting said lid to close and enclose said mat, and in a second instance, said mat can with said lid open be unfolded to extend out from the tool box and hang down over the one sidewall of said pichup truck;

d) a pair of mounting brackets in which each said mounting bracket is attached to inner surfaces of the upper sidewalls of said tool box, each said bracket having a socket;

e) said elongated rod being two telescopic tubes an expansion spring carried within said two telescopic tubes, and a pair of end cars on the opposite ends of said elongated rod, the ends of said elongated rod having said end caps extending into said sockets of said brackets, said spring holding said elongated rod in place within said tool box.

2. The combination as recited in claim 1, wherein said inner backing pad is fabricated out of a foam material.

3. The combination as recited in claim 2, wherein said foam material is synthetic resin.

4. The combination as recited in claim 1, wherein said outer soft durable sheet is fabricated out of a fabric material.

5. The combination as recited in claim 4, wherein said fabric material is a woven cloth.

6. The combination as recited in claim 1, wherein said mat further includes a logo printed on said outer soft durable sheet, so that when said mat hangs down over the one sidewall of the pickup truck, the logo can be seen therefrom for advertising purposes.

7. The method of protecting a pickup truck from damage caused by tools, said pickup truck having a pair of sidewalls and a tool box for holding tools mounted on a cargo bed with a lid hinged on a back wall of said tool box, the steps of said method comprising:

a) stitching one edge of a mat having an inner backing pad and an attached outer soft durable sheet to an elongated rod made from two telescoping tubes with an expansion spring inside said tubes and end caps on opposite ends of said tube;

b) removably installing said rod on the inside of said tool box adjacent a front wall of said tool box opposite the rear wall having the hinge for said lid by mounting brackets on side walls of said tool box, said brackets each having a socket to receive an endcap of said rod;

c) opening said tool box with the front wall of said too box adjacent a sidewall of said pickup and unfolding said mat to extend out from the tool box and hang down over said sidewall of said pickup truck; and d) folding said mat into said tool box covering any tools laying open in said tool box and closing said lid.

* * * * *